United States Patent
Hishida et al.

(10) Patent No.: US 10,284,658 B2
(45) Date of Patent: May 7, 2019

(54) MANAGEMENT SERVER, COMPUTER SYSTEM, AND METHOD

(71) Applicant: HITACHI, LTD., Tokyo (JP)

(72) Inventors: Wakayuki Hishida, Tokyo (JP); Tomohito Uchida, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 330 days.

(21) Appl. No.: 15/124,687

(22) PCT Filed: Aug. 22, 2014

(86) PCT No.: PCT/JP2014/072057
§ 371 (c)(1),
(2) Date: Sep. 9, 2016

(87) PCT Pub. No.: WO2016/027381
PCT Pub. Date: Feb. 25, 2016

(65) Prior Publication Data
US 2017/0019486 A1    Jan. 19, 2017

(51) Int. Cl.
*G06F 15/173* (2006.01)
*H04L 29/08* (2006.01)
(Continued)

(52) U.S. Cl.
CPC ............ *H04L 67/148* (2013.01); *G06F 3/067* (2013.01); *G06F 3/0619* (2013.01);
(Continued)

(58) Field of Classification Search
CPC . H04L 41/0681; H04L 67/10; H04L 67/1099; H04L 67/42; G06F 12/00; G06F 3/067; G06F 3/0688
(Continued)

(56) References Cited

U.S. PATENT DOCUMENTS

| | | | |
|---|---|---|---|
| 2009/0138753 A1 | 5/2009 | Tameshige et al. | |
| 2009/0259737 A1* | 10/2009 | Aikoh ................... | G06F 9/5077 709/221 |
| 2015/0149705 A1* | 5/2015 | Nito ...................... | G06F 3/0616 711/103 |

FOREIGN PATENT DOCUMENTS

| | | |
|---|---|---|
| JP | 2009-252204 A | 10/2009 |
| JP | 2012-090745 A | 5/2012 |

(Continued)

OTHER PUBLICATIONS

International Search Report of PCT/JP2014/072057 dated Oct. 28, 2014.

*Primary Examiner* — Wing F Chan
*Assistant Examiner* — Andrew Woo
(74) *Attorney, Agent, or Firm* — Mattingly & Malur, PC

(57) ABSTRACT

A management server includes: a memory; a communication interface coupled to a plurality of servers having a server processor and a non-volatile memory; and a management processor coupled to the memory and the communication interface. Data is written to the non-volatile memory by the server processor in accordance with startup of a program. The memory is configured to store a limit value of a cumulative write amount of the non-volatile memory. The management processor receives a cumulative write amount of the non-volatile memory from each of the plurality of servers and calculates, when a startup request for requesting startup of a first program is received, an evaluation value of the non-volatile memory in each server based on the limit value and the cumulative write amount, selects one startup server based on the evaluation values, and transmits an execution request for requesting startup of the first program to the startup server.

8 Claims, 15 Drawing Sheets

(51) Int. Cl.
  *G06F 12/00* (2006.01)
  *G06F 3/06* (2006.01)
  *G06F 9/4401* (2018.01)
  *H04L 29/06* (2006.01)

(52) U.S. Cl.
  CPC .......... *G06F 3/0659* (2013.01); *G06F 9/4416* (2013.01); *G06F 12/00* (2013.01); *H04L 67/10* (2013.01); *H04L 67/34* (2013.01); *H04L 67/42* (2013.01)

(58) Field of Classification Search
  USPC .......................................................... 709/223
  See application file for complete search history.

(56) References Cited

FOREIGN PATENT DOCUMENTS

| | | |
|---|---|---|
| JP | 2012-133824 A | 7/2012 |
| WO | 2013/175540 A1 | 11/2013 |

* cited by examiner

Fig. 3

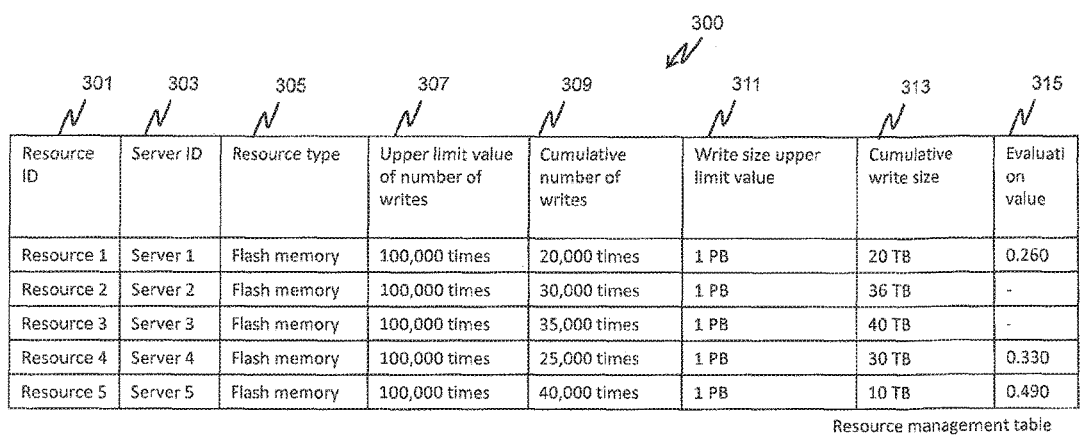

| Resource ID | Server ID | Resource type | Upper limit value of number of writes | Cumulative number of writes | Write size upper limit value | Cumulative write size | Evaluation value |
|---|---|---|---|---|---|---|---|
| Resource 1 | Server 1 | Flash memory | 100,000 times | 20,000 times | 1 PB | 20 TB | 0.260 |
| Resource 2 | Server 2 | Flash memory | 100,000 times | 30,000 times | 1 PB | 36 TB | - |
| Resource 3 | Server 3 | Flash memory | 100,000 times | 35,000 times | 1 PB | 40 TB | - |
| Resource 4 | Server 4 | Flash memory | 100,000 times | 25,000 times | 1 PB | 30 TB | 0.330 |
| Resource 5 | Server 5 | Flash memory | 100,000 times | 40,000 times | 1 PB | 10 TB | 0.490 |

Resource management table

Fig. 4

| Server ID | Previously-started up OS | Power supply state | Server state |
|---|---|---|---|
| Server 1 | OS1 | OFF | Normal |
| Server 2 | OS2 | ON | Normal |
| Server 3 | OS3 | OFF | Failure |
| Server 4 | OS4 | OFF | Normal |
| Server 5 | - | OFF | Normal |

Server management table

| 501 | 503 | 505 | 507 | 509 | 511 | 513 |
|---|---|---|---|---|---|---|
| OS ID | LU ID | Used resource type | Application | Average number of writes (per one startup) | Average write size (per one startup) | Target number of consecutive startups |
| OS1 | LU1 | Flash memory | Cache | 2000 times | 700 GB | 5 times |
| OS2 | LU2 | Flash memory | Data disk | 250 times | 150 GB | 30 times |
| OS3 | LU3 | Flash memory | Data disk | 30 times | 10 GB | 100 times |
| OS4 | LU4 | Flash memory | Cache | 4000 times | 1400 GB | 2 times |

OS management table

Resource evaluation viewpoint management table

Fig. 7

| OS ID | Resource ID | Server ID | Resource type | Upper limit value of number of writes | Cumulative number of writes | Write size upper limit value | Cumulative write size | Evaluation value |
|---|---|---|---|---|---|---|---|---|
| OS4 | Resource 4 | Server 4 | Flash memory | 100,000 times | 17,000 times | 1 PB | 27 TB | 0.231 |

OS-to-server evaluation value management table

Server startup pre-process program

Server startup process program

Server startup post-process program

MANAGEMENT SERVER, COMPUTER SYSTEM, AND METHOD

TECHNICAL FIELD

The present invention relates to a technique for managing a plurality of servers.

BACKGROUND ART

A server switching method is known by which control is implemented where, in a server system including an active server, standby servers, and a management server, the management server distributes a disk image of the active server to the standby servers in advance and, when a failure occurs in the active server, the management server selects a standby server capable of taking over business operations of the active server to execute the business operations (PTL 1).

CITATION LIST

Patent Literature

[PTL 1]
Japanese Patent Application Publication No. 2012-90745

SUMMARY OF INVENTION

Technical Problem

Meanwhile, in recent years, computers mounted with a non-volatile memory such as a flash memory in place of an HDD (hard disk drive) as a storage device have become the mainstream. The server switching method described above can be applied to a system in which a plurality of servers mounted with a non-volatile memory are coupled to a network. However, simply applying the method described above does not take characteristics of a non-volatile memory into consideration. Characteristically, although a non-volatile memory has an advantage of higher speeds when reading and writing data, since a non-volatile memory deteriorates as writing and deleting data are repetitively performed, there is a limit to the number of writes of a non-volatile memory. Therefore, when processing load concentrates on a specific server in a system including a plurality of servers mounted with a non-volatile memory, there is a risk that a product life of the non-volatile memory of the specific server becomes shorter than a product life of the server or a replacement period of the server as recommended by a manufacturer and the non-volatile memory must be replaced.

In particular, in a system including a plurality of servers, each server is often accessed by a plurality of clients. Therefore, when accesses from clients concentrate on a specific server, there is a risk that the non-volatile memory must be replaced before a product life or a replacement period of the server expires.

Solution to Problem

In order to solve the problem described above, a management server according to the present invention includes: a memory; a communication interface coupled to a plurality of servers each including a server processor and a non-volatile memory; and a management processor coupled to the memory and the communication interface. Data is written to the non-volatile memory by the server processor in accordance with startup of a program. The memory is configured to store a limit value of a cumulative write amount of the non-volatile memory. The management processor is configured to receive a cumulative write amount of the non-volatile memory from each of the plurality of servers and calculate, when a startup request for requesting startup of a first program is received, an evaluation value of the non-volatile memory in each server based on the limit value and the cumulative write amount, select one startup server from among the plurality of servers based on the evaluation values, and transmit an execution request for requesting startup of the first program to the startup server.

Advantageous Effects of Invention

Deterioration of non-volatile memories mounted to a plurality of servers can be leveled.

BRIEF DESCRIPTION OF DRAWINGS

FIG. 3 shows a resource management table.
FIG. 4 shows a server management table.
FIG. 5 shows an OS management table.
FIG. 7 shows an OS server evaluation management table.

DESCRIPTION OF EMBODIMENTS

Although information will be described hereinafter using expressions such as a "kkk table", information may be expressed by data structures other than a table. A "kkk table" can be referred to as "kkk information" in order to show that information is not dependent on data structure.

In addition, while a "program" is sometimes used as a subject when describing a process in the following description, since a program causes a prescribed process to be performed by appropriately using a storage resource (such as a memory) and/or a communication interface device (such as a communication port) when being executed by a processor, a "processor" may be used instead as a subject of a process. Conversely, a process described using a processor as its subject can be interpreted to be performed by executing one or more programs. While a processor is typically a microprocessor such as a CPU (central processing unit), the processor may include a hardware circuit which executes a part of the processing (for example, encoding/decoding and compression/expansion).

In addition, in the following description, "LU" is an abbreviation of a logical unit and refers to a logical storage device. An LU may be referred to as a logical volume. An LU may be a real LU or a virtual LU. A real LU is an LU based on one or more PDEVs. "PDEV" is an abbreviation of a non-volatile physical storage device and examples thereof include an HDD (hard disk drive) and an SSD (solid state drive). A plurality of PDEVs may constitute one or more RAID (redundant array of independent (or inexpensive) disks) groups (a RAID group may also be referred to as a parity group). Examples of a virtual LU may include an externally-coupled LU, a TP (thin provisioning)-LU, and a snapshot LU. An externally-coupled LU is based on a storage resource (such as an LU) of an external storage system coupled to the storage system and is an LU in accordance with storage virtualization technology. A TP-LU is an LU in accordance with capacity virtualization technology (typically, thin provisioning). A snapshot LU is an LU provided as a snapshot of an original LU. The storage system may be constituted by one or more storage apparatuses.

Furthermore, in the following description, when describing elements of a same type without distinguishing among the elements, reference signs will be used. However, when describing elements of a same type by distinguishing the elements from one another, identifiers (for example, at least one of numerals and characters) assigned to the elements may be used in place of reference signs of the elements.

Embodiment 1

Figure 1:
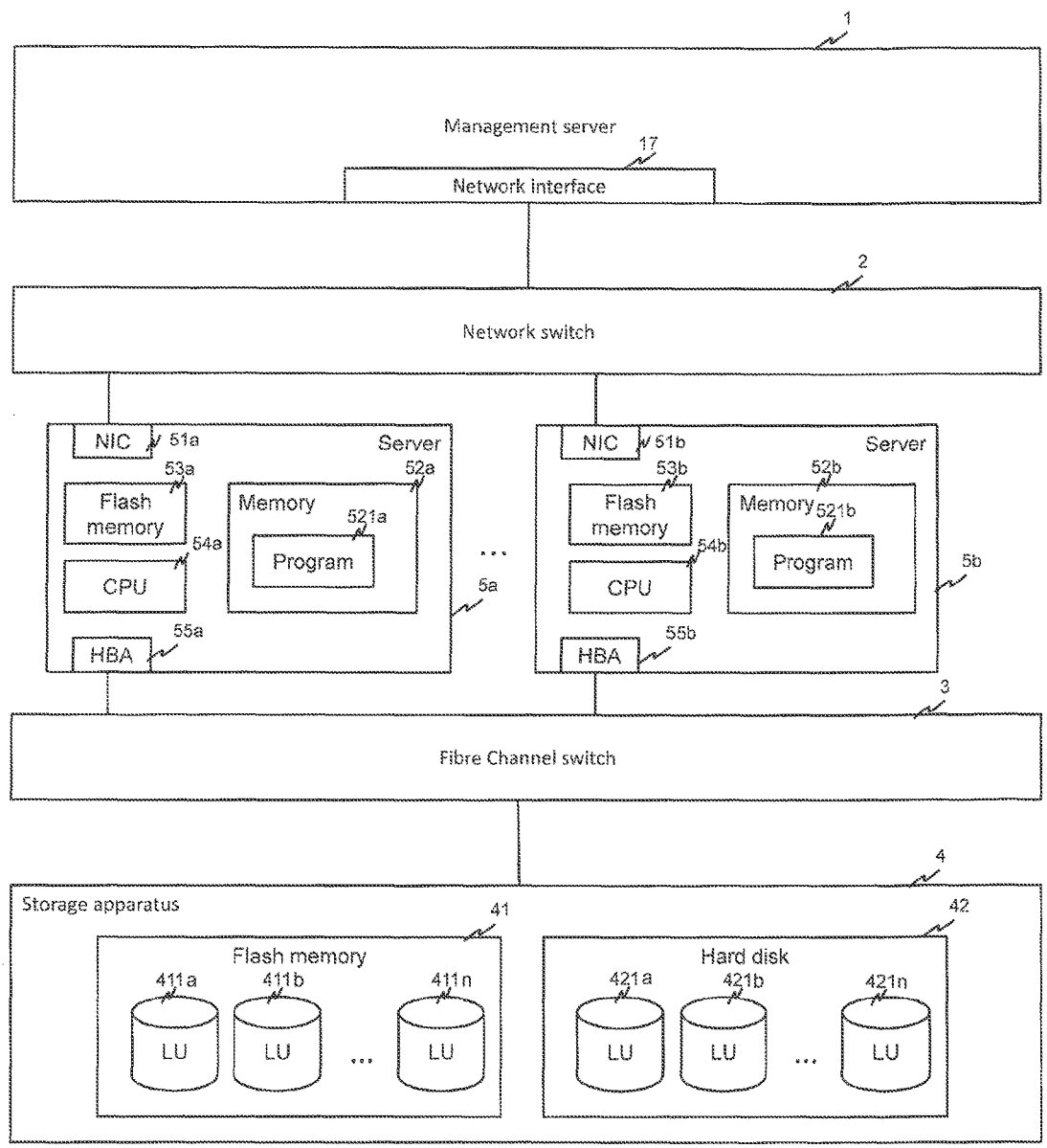
FIG. 1 is a configuration diagram of a computer system according to Embodiment 1.

FIG. 1 is a configuration diagram of a computer system according to Embodiment 1.

The computer system includes a management server 1, a network switch 2, a plurality of servers 5, a Fibre Channel switch 3, and a storage apparatus 4. The management server 1 includes, for example, a network interface 17 such as a network interface card (NIC). The network interface 17 of the management server 1 is coupled to the plurality of servers 5 via the network switch 2. The plurality of servers 5 are coupled to the storage apparatus 4 via the Fibre Channel switch 3. As a result, the plurality of servers 5 are capable of communicating with each other via the network switch 2 and the Fibre Channel switch 3. Moreover, the storage apparatus 4 may also be coupled to the network switch 2. The coupling between the management server 1 and the servers 5 is, for example, an Internet protocol-based communication network such as a LAN (local area network) and includes the network switch 2 and the like. The coupling between the servers 5 and the storage apparatus 4 is, for example, a communication network such as a SAN (storage area network) and includes the Fibre Channel switch 3 and the like. Moreover, the respective switches may be of a same type.

Each server 5 is a physical computer and includes a memory 52, a network interface card (NIC) 51, a flash memory 53, a processor (CPU) 54, and a host bus adapter (HBA) 55. Each of these components of the server 5 may be provided either singularly or in plurality. The NIC 51 is an interface which is coupled to the network switch 2 for communicating with the management server 1 and the HBA 55 is an interface which is coupled to the Fibre Channel switch 3 for communicating with the storage apparatus 4. Various interfaces may be used as the NIC 51 and the HBA 55. The memory 52 stores, for example, various programs 521*a* to be executed by the CPU 54. A specific example of the flash memory 53 is an SSD.

The storage apparatus 4 includes a hard disk drive 42 and a flash memory 41 as physical storage devices and a controller (not shown) coupled to the physical storage devices.

The flash memory 41 is, for example, an SSD. A RAID group may be constructed by a plurality of physical storage devices of a same type. The controller is internally provided with a processor and a memory and provides the server 5 with LUs (logical units) 411 (411*a*, 411*b*, . . . 411*n*) and 421 (421*a*, 421*b*, . . . 421*n*) based on one or a plurality of physical disks. Moreover, the physical storage devices may include either one of the hard disk drive 42 and the flash memory 41.

Figure 2:
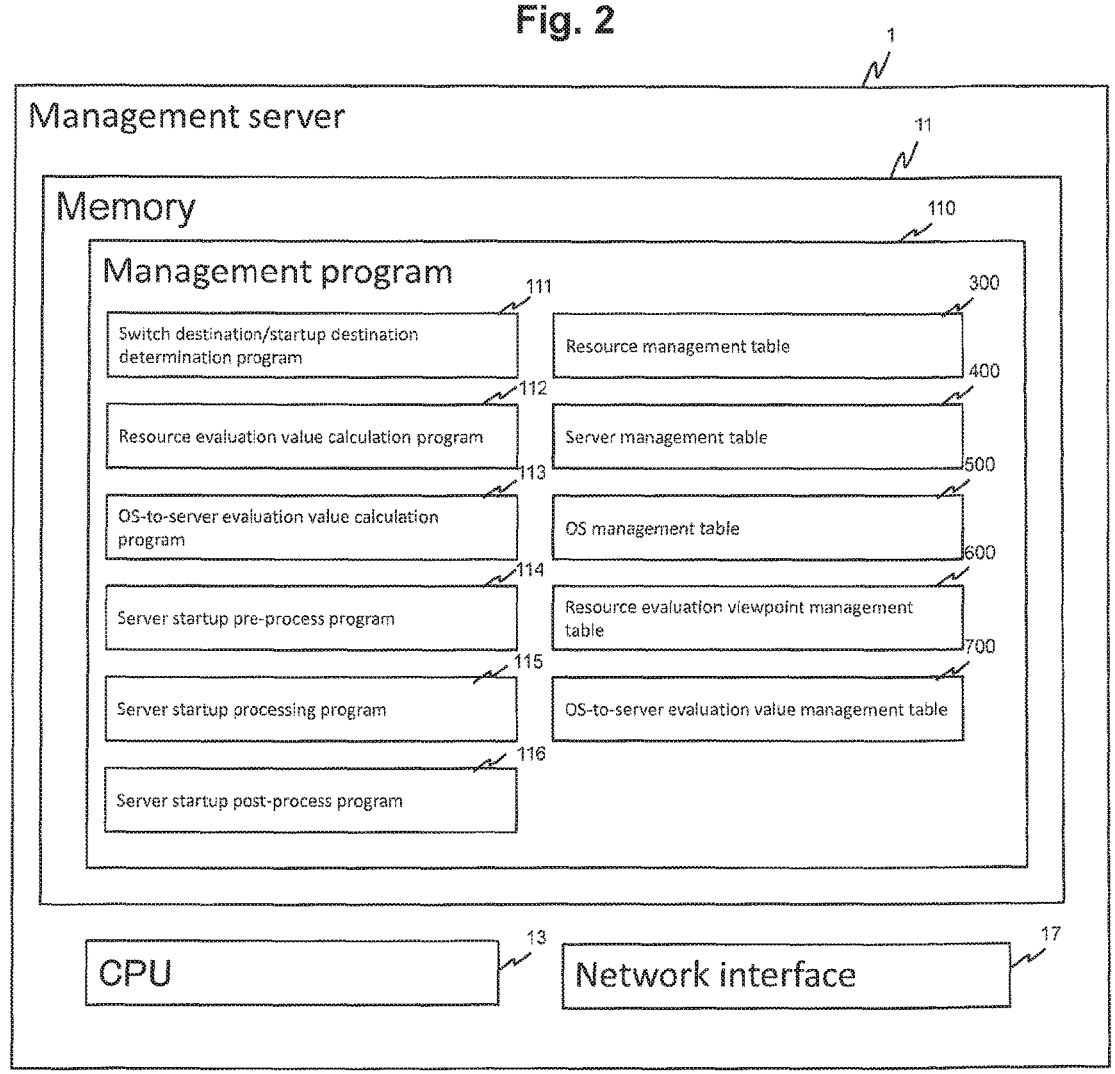
FIG. 2 is a logical configuration diagram of a management server.

FIG. 2 is a logical configuration diagram of the management server 1.

The management server 1 is a computer and includes a memory 11, a processor (CPU) 13, a disk interface 15, and a network interface 17. These elements are coupled to each other by an internal network such as a bus (not shown).

The network interface 17 is coupled to the network switch 2 and communicates with the plurality of servers 5.

The memory 11 stores a management program 110. The management program 110 includes computer programs to be executed by the CPU 13 as well as tables to be referred to when executing the computer programs. Specifically, for example, the management program 110 includes a switch destination/startup destination determination program 111, a resource evaluation value calculation program 112, an OS-to-server evaluation value calculation program 113, a server startup pre-process program 114, a server startup process program 115, a server startup post-process program 116, a resource management table 300, a server management table 400, an OS management table 500, a resource evaluation viewpoint management table 600, and an OS-to-server evaluation value management table 700. Details of the respective programs and tables will be presented later.

FIG. 3 shows the resource management table 300.

The resource management table 300 is a table which manages specification values and a cumulative write amount of resources included in each server. For example, the resource management table 300 has an entry for each resource. Each entry includes a resource ID 301 which identifies the resource, a server ID 303 which identifies the server 5 that includes the resource, a resource type 305 which indicates a type of the resource, an upper limit value of the number of writes 307 which indicates a product life of the resource in terms of the number of writes, a cumulative number of writes 309 of the resource, a write size upper limit value 311 of the resource, a cumulative write size 313 which indicates a product life of the resource in terms of a write size, and an evaluation value 315 of the resource.

The upper limit value of the number of writes 307 represents an upper limit value of the cumulative number of writes 309. The cumulative number of writes 309 represents, for example, an average value of the number of writes to each cell in the flash memory 53. The write size upper limit value 311 represents an upper limit value of the cumulative write size 313. Specifically, the cumulative write size 313 represents, for example, a cumulative data size that has been written to the flash memory 53. Moreover, the cumulative number of writes 309 and the cumulative write size 313 are values counted for each flash memory 53 and are acquired from each flash memory 53 via the CPU 54. While the cumulative number of writes 309 represents an average value in the flash memory 53, the cumulative number of writes 309 is not limited to an average value and other values such as a minimum value and a median may be used instead.

In addition, the upper limit value of the number of writes 307 and the write size upper limit value 311 are specification values of each flash memory 53 and are configured in advance.

Moreover, while the flash memory 53 is described as the only resource managed by the table 300 in the present embodiment for the sake of brevity, other resources may also be managed by the table 300. In addition, while one resource (in other words, the flash memory 53) is associated with one server in the table 300 in the present embodiment for the sake of brevity, it is obvious that a plurality of resources may be associated with one server.

FIG. 4 shows the server management table 400.

The server management table 400 is a table which manages a state of each server 5. For example, the server management table 400 has an entry for each server 5. Each entry includes a server ID 401 which identifies the server 5, a previous startup OS 403 which identifies an OS previously started up on the server, a power supply state 405 which indicates whether power of the server is turned on or off, and a server state 407 which indicates whether or not the server is operating normally. Moreover, the previous startup OS 403 is, in other words, an OS last started up on each of the plurality of servers 5. Furthermore, a program other than an OS may be used as the program to be started up by the server 5. Moreover, while the present embodiment assumes that, by executing an OS, a business operation is performed on the server, this assumption is not restrictive. In addition, the present embodiment assumes a computer system in which one business operation is executed by one server. In other words, while it is assumed that one OS is executed on one server, this assumption is not restrictive. For example, with respect to a server 2, the diagram shows that the previous startup OS is "OS2", the power supply state 405 is "ON", and the server state 407 is "normal". This means that OS2 is currently being executed on the server 2. In addition, for example, with respect to a server 1, the diagram shows that the previous startup OS is "OS1", the power supply state 405 is "OFF", and the server state 407 is "normal". This means that the server 1 is currently in a suspended state and that OS1 had been executed prior to the suspension. Furthermore, for example, with respect to the server 5, it is shown that there is no previous startup OS, the power supply state 405 is "OFF", and the server state 407 is "normal". This means that the server 5 is a standby server on which an OS is yet to be executed. In addition, with respect to servers 1, 3, and 4, since the power supply state 405 is "OFF" and the server state 407 is "normal", a different OS from the previous startup OS may possibly be started up.

Moreover, in the present embodiment, a server indicates a physical server. Each server may start up one OS when power is turned on and, at a next startup timing after power is turned off, each server may start up a different OS or may consecutively start up the OS which had been started up when power was previously turned on. In addition, while an example in which one OS is executed by one server 5 at an arbitrary timing is described in the present embodiment, the plurality of servers 5 may execute a same OS.

FIG. 5 shows an OS management table.

The OS management table 500 is a table which manages information on each OS. For example, the OS management table 500 has an entry for each OS. Each entry includes an OS ID 501 which identifies the OS, an LU ID 503 which identifies an LU storing programs and data necessary for starting up the OS, a used resource type 505 which represents a type of resource used by the OS (in the present embodiment, only the flash memory 53), an application 507 of the resource by the OS, an average number of writes 509 to the resource per one startup of the OS, an average write size 511 to the resource per one startup of the OS, and a target number of consecutive startups 513 which represents a target value of the number of times the OS is consecutively started up on one server.

Data written by the CPU 54 to the flash memory 53 in accordance with the startup of an OS includes startup data (startup disk) and update data. Startup data includes programs and data necessary for starting up an OS and is written to the flash memory 53 prior to startup of the OS. Update data is data for which a write request is made by the OS and is written to the flash memory 53 after the startup of the OS.

Moreover, the application 507 of the flash memory 53 as a resource is, for example, either a cache memory (cache) or a data disk. When the flash memory 53 is used in a cache memory application, a CPU 54a copies data in the flash memory 53 to a corresponding LU. Accordingly, data with high access frequency in the data written to the LU is to be stored in the flash memory 53. On the other hand, when the flash memory 53 is to be used in a data disk application, the update data in the flash memory 53 is not copied to an LU.

In addition, as described earlier, upper limit values of a cumulative number of writes, a cumulative write size, and the like are set for the flash memory 53. When a server 5 executes a given OS and subsequently starts up a different OS, the large number of occurrences of copying and erasing operations of data related to an OS may result in deterioration of the flash memory 53. The target number of consecutive startups 513 is set in order to prevent the OS that is started up on a server from being frequently changed. Hereinafter, an example in which copying and erasing of data related to an OS occur will be specifically described.

When a given server (for example, a server 5a) executes an OS a and subsequently takes over an OS b having been executed by another server (for example, a server 5b), update data written to a flash memory 53b by the OS bon the server 5b is required. This is because the update data of the OS b is latest data written by the OS b. In addition, when the update data of the OS b is successfully copied to a flash memory 53a of the server 5a, the update data of the OS b in the flash memory 53b must be erased. This is to avoid the OS b on the server 5b from being accessed when the server 5a executes the OS b from the perspectives of data consistency, security, and the like.

Moreover, when storing update data of the OS b in the flash memory 53a of the server 5a in the case described above, there are two conceivable outcomes depending on an application of the flash memory 53a. Firstly, when the application of the flash memory 53a is a cache, data written by the OS a in the flash memory 53a (update data of the OS a) must be erased. This is because the update data of the OS a is stored not only in the flash memory 53a but also in a corresponding LU. Secondly, when the application of the flash memory 53b is a data disk, update data of the OS b in the flash memory 53b must be copied to the flash memory 53a. This is because it is high likely that latest update data of the OS b is only stored in the flash memory 53b.

Moreover, while the present embodiment assumes that startup data is stored in an LU and describes a case where the server 5 starts up an OS based on the startup data stored in the LU, this case is not restrictive. For example, the server 5 may first read startup data stored in an LU to its own flash memory 53 and start up an OS based on the read startup data. In addition, for example, when an OS is written to the flash memory 53 in advance, startup data need not be stored in an LU.

Moreover, while each OS uses one LU and one resource (flash memory) in the present embodiment, each OS may use a plurality of LUs or resources. In addition, while one application 507 is set for each resource (flash memory) in the present embodiment, a resource (flash memory) may be used for a plurality of applications.

Figure 6:
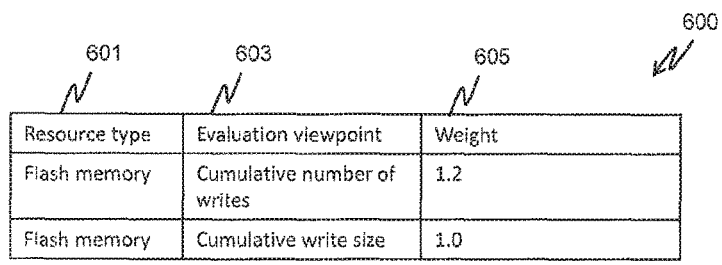
FIG. 6 shows a resource evaluation viewpoint management table.

FIG. 6 shows the resource evaluation viewpoint management table 600.

The resource evaluation viewpoint management table 600 is a table which shows a weight for each evaluation viewpoint of a resource. For example, the resource evaluation viewpoint management table 600 has an entry for each evaluation viewpoint of a resource. Each entry includes a resource type 601 which indicates a resource type, an evaluation viewpoint 603 which indicates a type of a value of a target of evaluation, and a weight 605 which indicates an importance of the evaluation viewpoint.

Next, an OS startup process performed by the management server 1 will be described. This is a process in which the management server 1 causes a server to start up an OS and is started upon reception of an OS startup request that is a request to perform this process. In the present embodiment, a process in which, when the management server 1 receives an OS startup request specifying a server, an OS being executed on the server is started up on another server will be described. Specifically, for example, an OS startup request may be information specifying a server at which a failure has occurred and may be transmitted from the server at which the failure has occurred or from another server having detected the failure. Alternatively, for example, an OS startup request may be a request from a client of the management server 1 such as an administrator for switching servers by specifying a switching source server. In the following description, an OS that is a startup target will be referred to as a target OS. In the present embodiment, a target OS is an OS being executed on a server specified by an OS startup request. In addition, in the following description, a server that is a switching destination or, in other words, a server that is a startup destination of the target OS will be referred to as a startup server.

Furthermore, in the present embodiment, the startup server is assumed to be a server with its power turned off. In addition, it is assumed that one flash memory 53 is associated with each server 5 as a resource which stores a part of or all of data (update data) to be written by an OS that is started up on the server 5. However, these configurations are not restrictive. Moreover, while it is assumed that each server 5 starts up an OS according to startup data stored in an LU corresponding to the OS as described above, this configuration is not restrictive. A resource (the flash memory 53) of each server 5 may store startup data of an OS in addition to update data of the OS.

Figure 8:
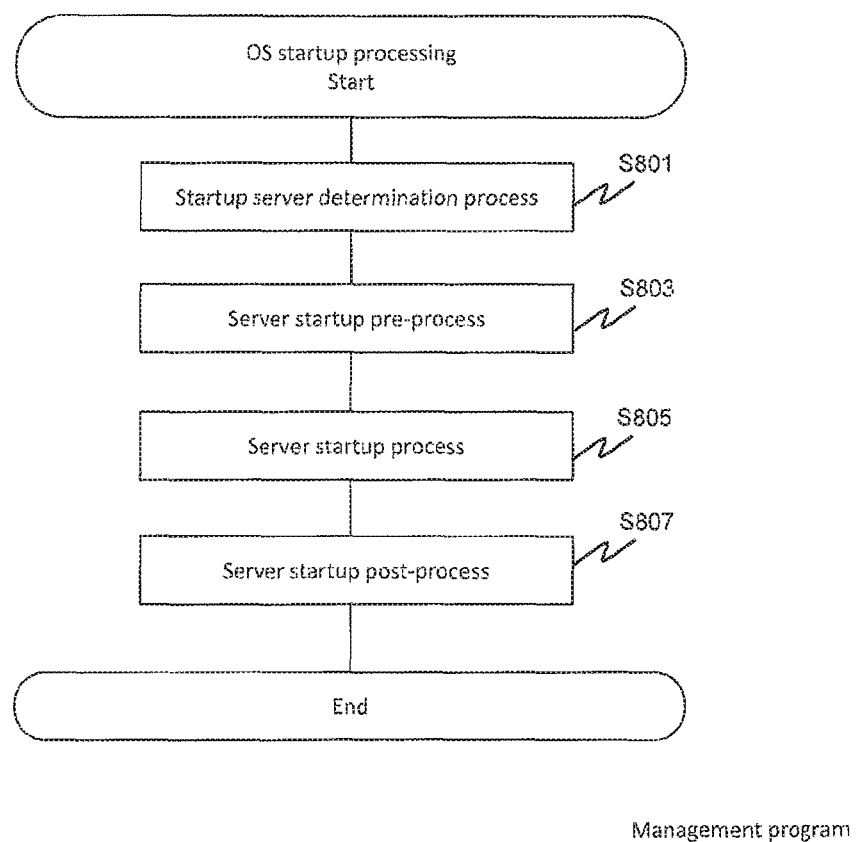
FIG. 8 is a flow chart of a management program.

FIG. 8 is a flow chart of an OS startup process by a management program.

When the server 5 at which a failure has occurred is detected, execution of the management program 110 by the management server 1 is triggered by the reception of an OS startup request that specifies the server 5 at which the failure has occurred. Moreover, in the following description, a step will be simply abbreviated as "S".

In S801, the management program 110 executes a startup server determination process. Specifically, for example, the management program 110 hands over the process to the switch destination/startup destination determination program 111 to be described later.

In S803, the management program 110 executes a server startup pre-process. Specifically, for example, the management program 110 hands over the process to the server startup pre-process program 114 to be described later.

In S805, the management program 110 executes a server startup process. Specifically, for example, the management program 110 hands over the process to the server startup process program 115 to be described later.

In S806, the management program 110 executes a server startup post-process. Specifically, for example, the management program 110 hands over the process to the server startup post-process program 116 to be described later.

According to the processes described above, the management server 1 can start up an OS which had been executed on a server at which a failure had occurred at an optimal server (a startup server) that differs from the server at which the failure had occurred.

Figure 9:
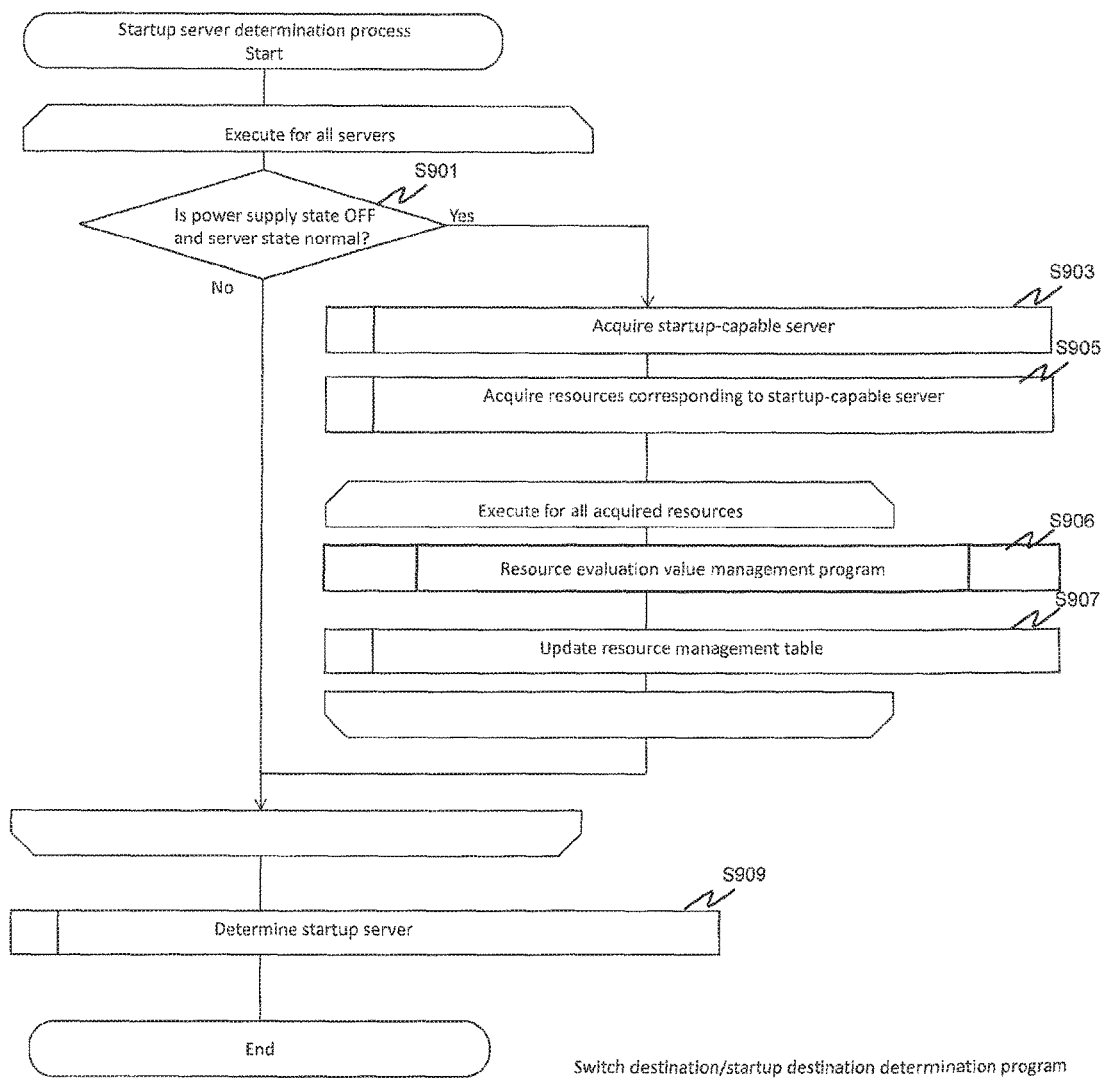
FIG. 9 is a flow chart of a startup server determination process.

FIG. 9 is a flowchart of the startup server determination process.

This is a process executed by the switch destination/startup destination determination program 111 in S801 shown in FIG. 8.

With this process, an appropriate server can be selected in consideration of usage of a flash memory of each server as a startup server which starts up the target OS as an alternative to the server at which a failure had occurred.

The program 111 respectively executes the process of S901 (S903 to S907) for all servers 5 registered in the server management table 400.

In S901, the program 111 refers to the server management table 400 and determines whether the power supply state 405 of the server is "OFF" and whether the server state of the server is "normal". When the power supply state 405 of the server is "ON" or the server state of the server is "abnormal" (No in S901), the program 111 selects another server in the server management table 400 and repeats S901.

On the other hand, when the power supply state of the server is "OFF" or the server state of the server is "normal" (Yes in S901), the program 111 acquires the server as a server capable of starting up the target OS (a startup-capable server) (S903). Subsequently, the program 111 refers to the resource management table 300 and acquires a resource having the resource ID 301 corresponding to the server ID 303 of the acquired startup-capable server or, in other words, a resource included in the startup-capable server. When the startup-capable server includes a plurality of resources, all of the resources are acquired.

The program 111 executes S906 and S907 with respect to all resources included in the startup-capable server. The program 111 hands over the process to the resource evaluation value calculation program 112 (S906). Subsequently, an evaluation value of each resource as calculated by the resource evaluation value calculation program 112 is acquired and the resource management table 300 is updated with the acquired evaluation values 315 (S907).

In S909, referring to the resource management table 300, a startup-capable server including a resource with a lowest evaluation value 315 is determined as a startup server.

According to the process described above, the program 111 can determine an optimal server as a server (a startup server) to start up an OS which had been executed on a server at which a failure had occurred. Specifically, based on an evaluation value of a resource included in a server which has its power turned off and which is in a normal state, the program 111 can determine a server with a lowest evaluation value based on a proportion of a cumulative write amount as the startup server. Accordingly, resources (flash memories 53) of a plurality of servers can be uniformly used and product lives of the resources (flash memories 53) included in the plurality of servers can be averaged. Therefore, the product life of a resource (flash memory 53) can be prevented from becoming shorter than a product life and a replacement period of a server.

Figure 10:
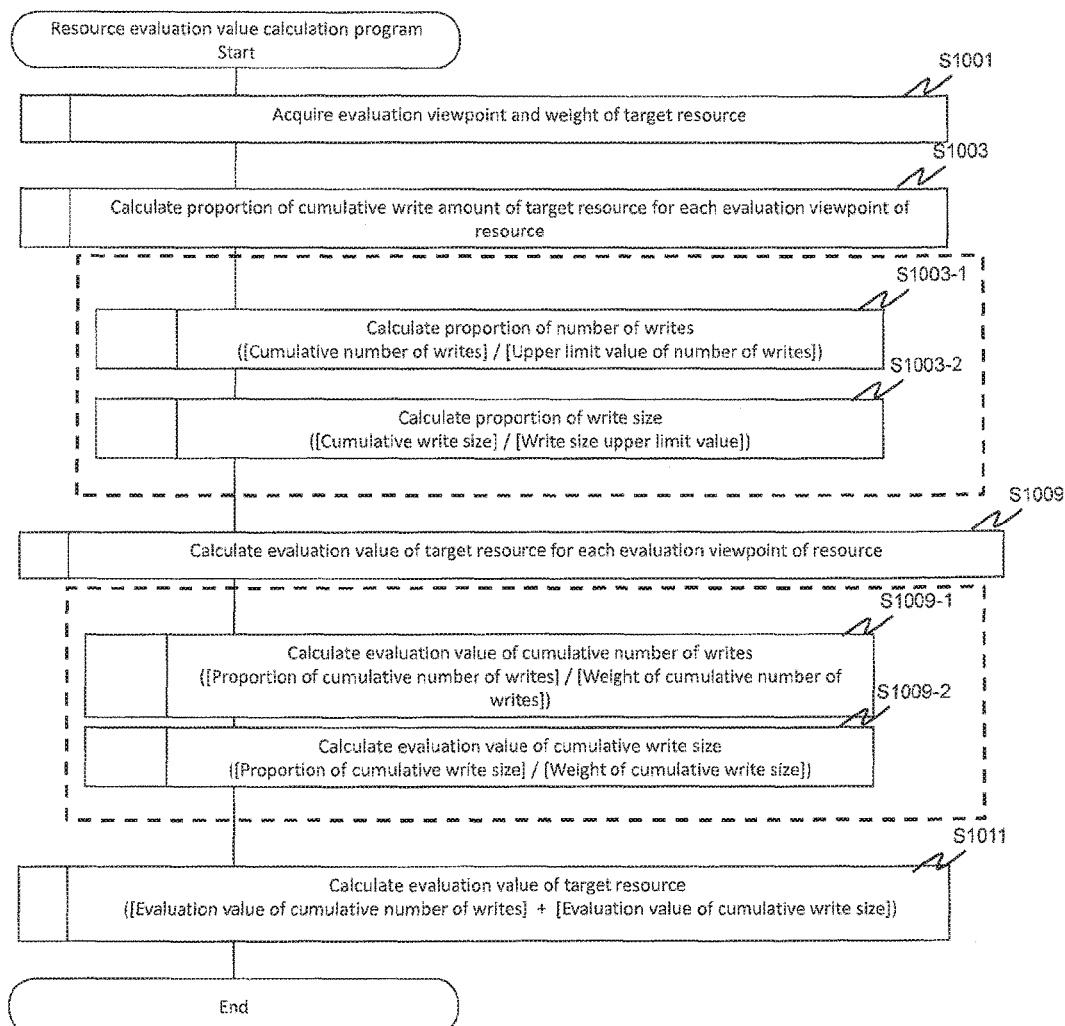
FIG. 10 is a flow chart of a resource evaluation value calculation program.

FIG. 10 is a flow chart of a resource evaluation value calculation program.

The resource evaluation value calculation program 112 is the process of S906 shown in FIG. 9. In this process, the program 112 calculates an evaluation value of a startup-capable server based on information on the resource included in the startup-capable server.

In S1001, the program 112 refers to the resource evaluation viewpoint management table 600 and, based on information on a target OS, acquires the evaluation viewpoint 603 and the weight 605 of a resource corresponding to the target OS. In the following description, a resource corresponding to a target OS will be referred to as a target resource.

In S1003, the program 112 calculates a proportion of a cumulative write amount of the target resource for each evaluation viewpoint of the resource. In the present embodiment, evaluation viewpoints of a resource include a cumulative number of writes to a flash memory and a cumulative write size to the flash memory. Therefore, hereinafter, steps for each evaluation viewpoint in the present step will be specifically described (the steps in the dotted frames).

In S1003-1, the program 112 refers to the resource management table 300 and calculates a proportion of the number of writes that is a proportion of a cumulative number of writes with respect to an upper limit value of the number of writes of a target resource.

In S1003-2, the program 112 refers to the resource management table 300 and calculates a proportion of a write size that is a proportion of a cumulative write size with respect to a write size upper limit value of a target resource.

In S1009, the program 112 calculates an evaluation value of the target resource for each evaluation viewpoint of the target resource. Hereinafter, steps for each evaluation viewpoint in the present step will be specifically described (the steps in the dotted frames).

In S1009-1, with respect to the target resource, the program 112 calculates a value by multiplying the proportion of the number of writes by a weight as an evaluation value of the cumulative number of writes.

In S1009-2, with respect to the target resource, the program 112 calculates a value by multiplying the proportion of the cumulative write size by a weight as an evaluation value of the cumulative write size.

In S1011, the program 112 calculates a value by adding up evaluation values of the respective evaluation viewpoints calculated in S1009 or, in other words, the evaluation value of the cumulative number of writes and the evaluation value of the cumulative write size as an evaluation value of the target resource. In addition, the program 112 updates the resource management table 300 with the calculated evaluation value, and hands over the calculated evaluation value to the program 111 to end the process.

With the process described above, a value to serve as an index of the product life of the target resource can be calculated as an evaluation value. Moreover, this process may be regularly or irregularly executed regardless of a timing of S906. In addition, the evaluation value of the target resource is not limited to the calculation method described above. For example, a predicted value of a remaining product life of the target resource may be calculated as an evaluation value.

Moreover, while an evaluation value of a resource based on a proportion of a cumulative write amount for each of two evaluation viewpoints including a cumulative number of writes and a cumulative write size is calculated in the process described above, this is not restrictive. For example, an evaluation value may be calculated based on a proportion of a cumulative write amount of any one evaluation viewpoint of a cumulative number of writes and a cumulative write size or a different evaluation viewpoint may be added.

In addition, while an evaluation value of a target resource is calculated by adding evaluation values of respective evaluation viewpoints in the process described above, any calculation method may be used. Furthermore, while an evaluation value of each evaluation viewpoint is weighted in accordance with an importance of the evaluation viewpoint in the process described above, this is not restrictive.

Figure 11:
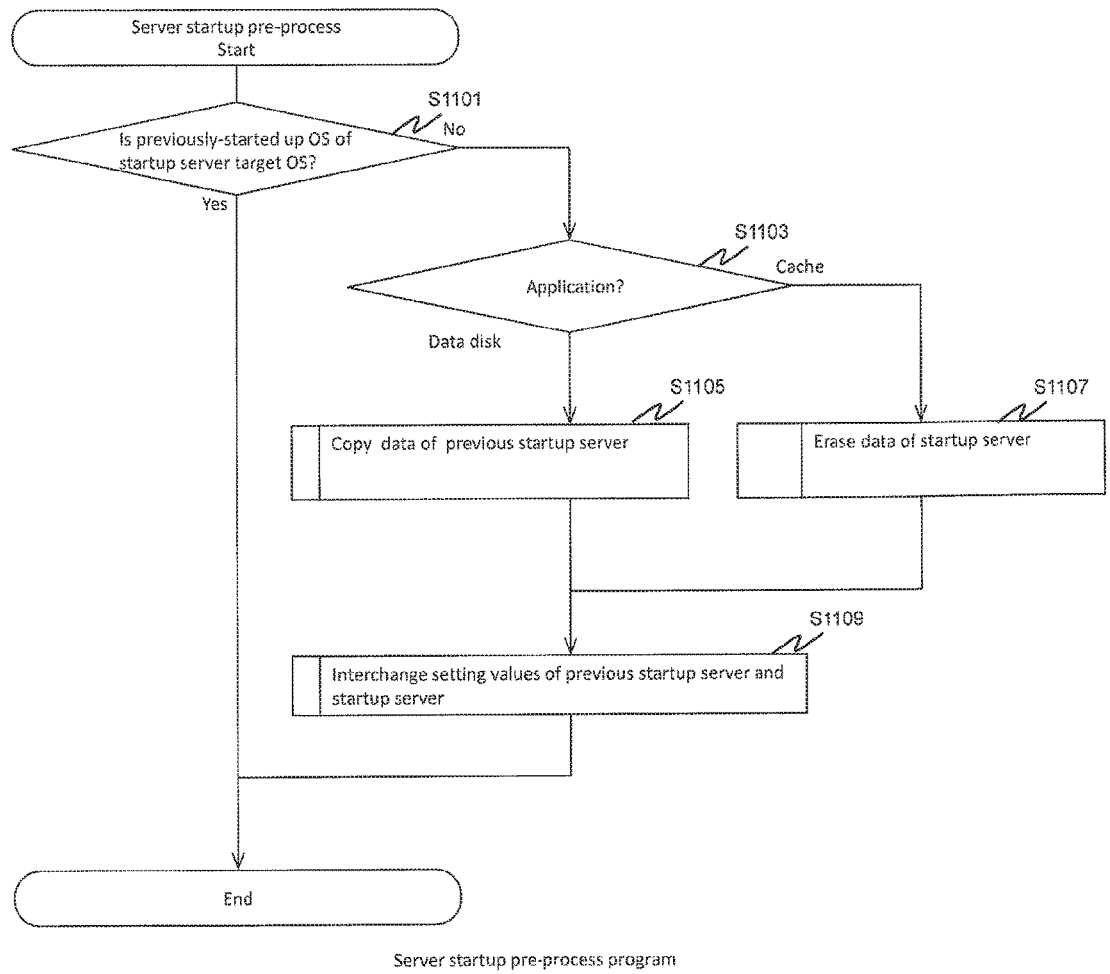
FIG. 11 is a flow chart of server startup pre-process.

FIG. 11 is a flow chart of server startup pre-process.

This is a process in which the management server 1 performs necessary configurations to enable a target OS to be started up at a startup server. This process is executed by the server startup pre-process program 114 in S803 shown in FIG. 8.

In S1101, the program 114 refers to the server management table 400 and determines whether or not the previous startup OS of the startup server is the target OS. When it is determined that the previous startup OS of the startup server is the target OS (Yes in S1101), the program 114 ends the process.

On the other hand, when it is determined that the previous startup OS of the startup server is not the target OS (No in S1101), the program 114 refers to the OS management table 500 and determines an application of a flash memory (a resource) corresponding to the target OS.

When it is determined that the application of the flash memory is a data disk (data disk in S1103), update data in the flash memory is not stored in an LU. Therefore, the program 114 refers to the server management table 400, specifies a server having previously started up the target OS, transmits, to the specified server and the startup server, an indication to have update data in the flash memory included in the specified server copied to the flash memory 53 of the startup server (S1105), and advances the process to S1109. Moreover, in the present embodiment, the previously-started up server is a server in which a failure had occurred.

On the other hand, when it is determined that the application of the flash memory 53 is a cache (cache in S1103), the program 114 transmits an indication to erase a part of or all of the data in the flash memory 53 to the startup server and advances the process to S1109. Moreover, for example, the startup server having received this indication may erase all data in the flash memory 53 regarding an OS previously started up by the startup server itself. In addition, for example, when startup data of the previous startup OS and data in a cache area used by the OS are stored in the flash memory 53, the startup server may erase only the data in the cache area.

In S1109, the program 114 interchanges configuration values of the server previously having started up the target OS and the startup server and ends the process. In this case, configuration values includes values of BIOS configurations and a WWN (World Wide Name).

According to the process described above, even when an OS previously started up by a startup server is not a target OS, data necessary for starting up the target OS can be acquired from the server having previously started up the target OS.

Specifically, when update data of the target OS is stored in the flash memory 53 of the server having previously started up the target OS and the flash memory 53 is being used as a data disk, by copying data in the flash memory 53 to the startup server in advance, the startup server can be started up in a smooth manner when power of the startup server is turned on. Moreover, the copying of data may be realized according to a method similar to a cold standby switching method of a server mounted with an internal HDD.

In addition, when the OS having been started up by the startup server is an OS other than the target OS, update data of the OS can be erased from the startup server.

Specifically, when update data of the target OS is stored in the flash memory 53 of the server having previously started up the target OS and the flash memory 53 of the server 5 having previously started up the target OS is being used as a cache, data that forms a basis of update data on the flash memory 53 is stored in an LU. Therefore, by erasing this data, unnecessary data can be prevented from remaining on the server. Moreover, erasing of data may be realized according to a method such as starting up an OS for data erasure by a PXE (preboot execution environment) boot.

In addition, configurations necessary for startup of the target OS by the startup server can be changed. Specifically, settings of the startup server can be changed according to a method similar to a conventionally well-known cold standby switching method upon an occurrence of a server failure.

While data in the flash memory 53 of the server having previously started up the target OS is copied to the flash memory 53 of the startup server in S1105 in the process described above, this is not restrictive. For example, after power of the server having previously started up the target OS is turned off, the management server 1 may write a backup of the flash memory 53 of the server having previously started up the target OS to the storage apparatus 4.

Furthermore, in the process described above, when the startup server is unable to access the server 5 having previously started up the target OS in S1105, for example, data in an LU which forms a basis of the flash memory 53 of the server 5 may be acquired. This is effective when, for example, the flash memory 53 of the server 5 having previously started up the target OS is functioning as a write-through cache.

Figure 12:
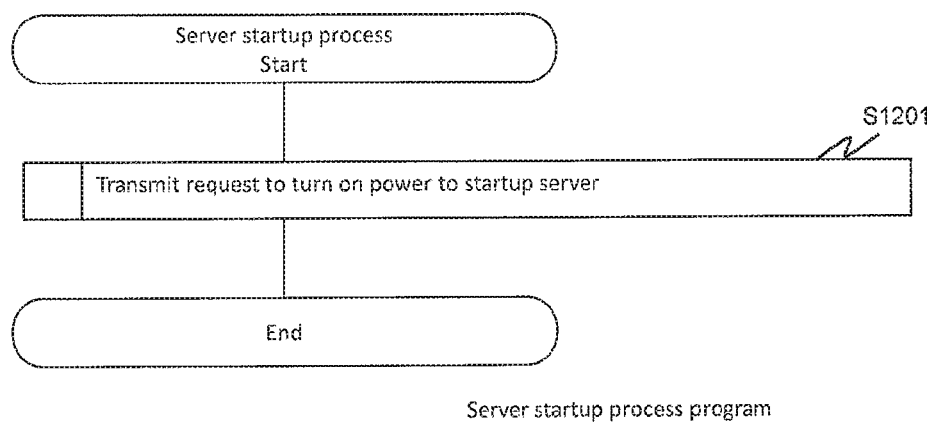
FIG. 12 is a flow chart of a server startup process program.

FIG. 12 is a flow chart of a server startup process program.

This is a process in which the management server 1 starts up a startup server. This process is executed by the server startup process program 115 in S805 shown in FIG. 8.

In S1201, the program 115 transmits an indication to turn on power to the startup server and ends the process.

According to the process described above, the startup server can start up the target OS. Moreover, the program 115 can add information on a date and time at which power is to be turned on to the indication to turn on the power of the startup server. Accordingly, the startup server having received the indication can turn on power at the instructed date and time. For example, the program 115 may perform this process during a time slot in which there is a smaller load to configure the date and time of startup of the startup server.

Figure 13:
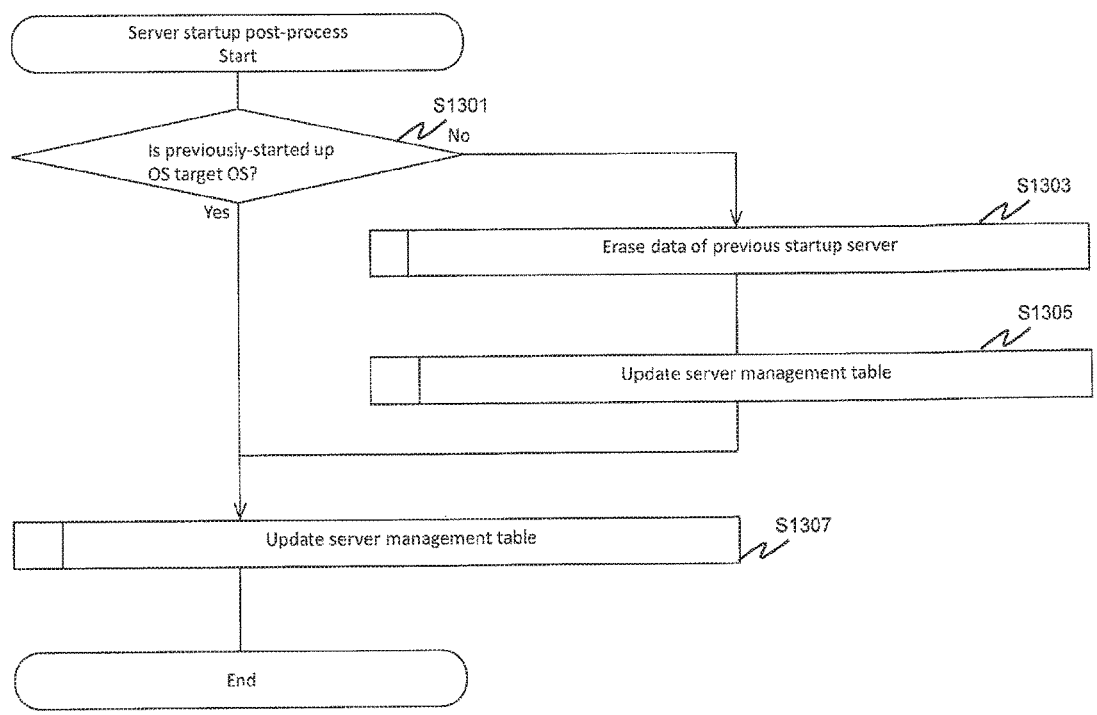
FIG. 13 is a flow chart of a server startup post-process program.

FIG. 13 is a flow chart of a server startup post-process program.

This is a process performed by the management server 1 after the target OS is started up at the startup server. This process is executed by the server startup post-process program 116 in S807 shown in FIG. 8.

In S1301, the program 116 refers to the server management table 400 and determines whether or not the previous startup OS of the startup server is the target OS.

When it is determined that the previous startup OS of the startup server is not the target OS (No in S1301), the program 116 issues an indication to erase data in the flash memory of the server having previously started up the target OS to the server having previously started up the target OS (S1303). Subsequently, the program 116 deletes the field of the previous startup OS 403 corresponding to the server ID 401 of the server having previously started up the target OS in the server management table 400 (S1305) and advances the process to S1307.

On the other hand, when it is determined that the previous startup OS of the startup server is the target OS (Yes in S1301), the program 114 changes the power supply state 405 of the startup server in the server management table 400 to "ON" (S1307) and performs the process.

According to the process described above, the management server 1 can update information of respective servers at which the OS startup process has been completed. Accordingly, consistency between an actual environment of each server and information on the server as managed by the management server can be maintained.

In addition, according to the process described above, when the startup server differs from the server having previously started up the target OS, unnecessary data can be prevented from being retained in the server. Furthermore, since data in the flash memory of the server having previously started up the target OS is unnecessary data which is not latest information, by erasing the data, security risks such as data leakage can be prevented. In particular, since a server is used by a large number of users, unnecessary data must be erased.

Embodiment 2

Embodiment 2 will now be described with reference to FIGS. 7, 14, and 15. Similar components to Embodiment 1 will be described by assigning same reference signs. In addition, descriptions of components similar to Embodiment 1 may sometimes be omitted.

In the present embodiment, a case will be described in which an OS startup process (refer to FIG. 8) is started in response to receiving an OS startup request which specifies an OS and which is input to a client of the management server 1 or to an input apparatus by, for example, an administrator. In this process, a server which starts up the OS specified by the OS startup request is determined as a startup server. Moreover, a trigger of the start of the OS startup process is not limited to the reception of an OS startup request from an administrator or the like. For example, a start (and end) of an OS may be scheduled in advance at the management server 1. In this case, a scheduled OS start time corresponds to the reception of an OS startup request. FIG. 7 shows the OS-to-server evaluation value management table 700.

The OS-to-server evaluation value management table 700 is a table that is temporarily used during an OS takeover process according to the present embodiment. Specifically, the table 700 is created in a startup server changing process (to be described later) when calculating an evaluation value of a server having previously started up a target OS. Moreover, in the following description, a server at which a last-started up OS is the target OS and which has its power turned off will be referred to as a previous startup server. The OS-to-server evaluation value management table 700 has an entry for each target OS. A target OS includes an OS ID 701 which identifies the OS, a resource ID 703 which identifies a resource used by the OS, a server ID 705 of the previous startup OS, a resource type 707 which indicates a type of the resource, an upper limit value of the number of writes 709 of the resource, a cumulative number of writes 711 of the resource, a write size upper limit value 713 of the resource, a cumulative write size 715 of the resource, and an evaluation value 717 of the resource. Moreover, while the flash memory 53 is the only resource managed by the table 300 in the present embodiment, other resources may also be managed by the table 300. In addition, since the resource type 707, the upper limit value of the number of writes 709, the cumulative number of writes 711, the write size upper limit value 713, and the cumulative write size 715 are the same as the items with the same names in the resource management table 300, a description thereof will be omitted.

Hereinafter, the OS startup process according to the present embodiment will be described.

Figure 14:
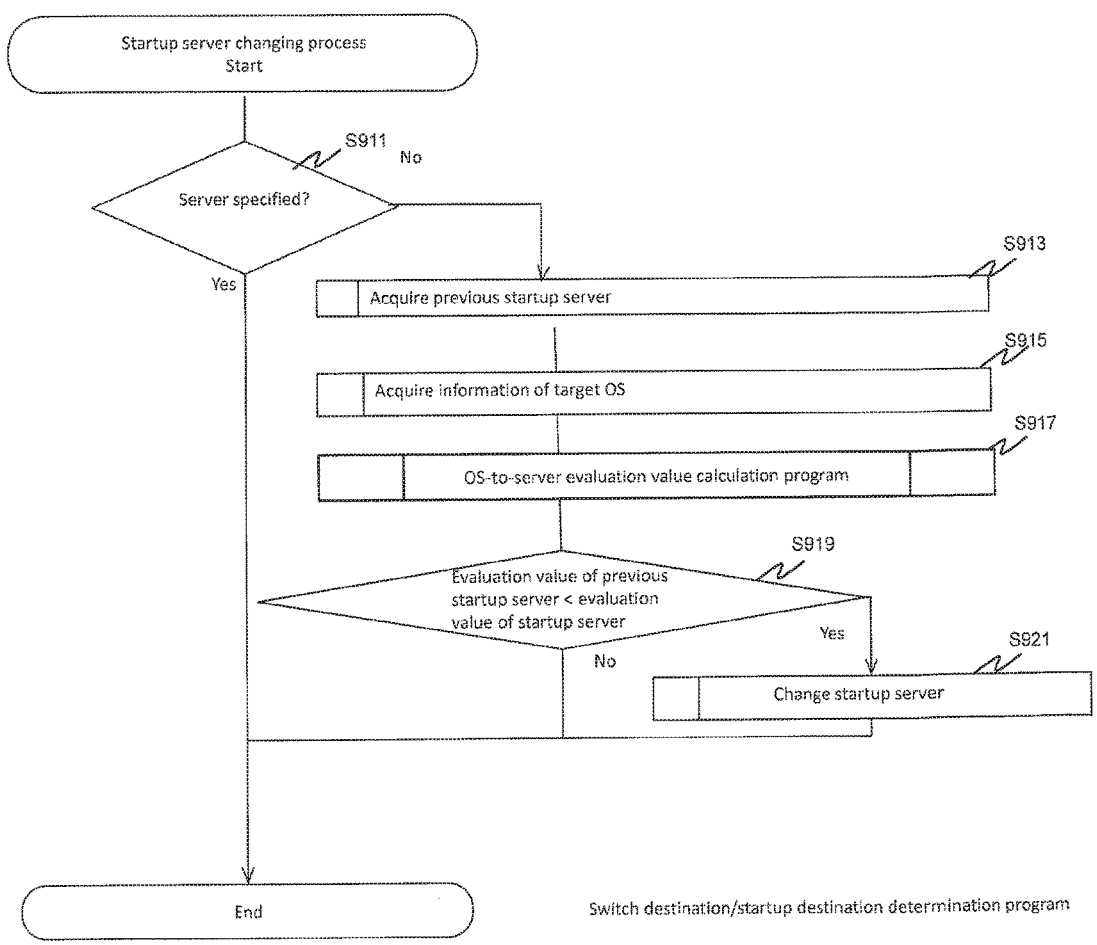
FIG. 14 is a flow chart of a startup server changing process.

FIG. 14 is a flow chart of a startup server changing process.

In the present embodiment, this process is performed after the startup server determination process (FIG. 9) in the OS startup process. A description of the startup server determination process will be omitted.

In S911, the program 111 determines whether or not a received OS startup request is a request that specifies a server. When a server is specified (Yes in S911), the program 111 ends the process. In this case, the startup server determined in S909 shown in FIG. 9 is the startup server.

On the other hand, when a server is not specified (No in S911) or, in other words, in the case of a use start request of the target OS, the program 111 advances the process to S913.

In S913, the program 111 refers to the server management table 400 and acquires a server with the previous startup OS 403 matching the target OS from the startup-capable servers acquired in S903. The server acquired at this point is a server which is in a normal state, which has its power turned off, and which is a server (previous startup server) having been executing a same OS as the OS executed by a previous startup server of the target OS.

In S915, the program 111 refers to the OS management table 500 and acquires information on the target OS.

In S917, the program 111 hands over the process to the OS-to-server evaluation value calculation program 113 and acquires an evaluation value of the target OS startup server from the OS-to-server evaluation value calculation program 113.

In S919, the program 111 determines whether or not an evaluation value of the startup server exceeds the evaluation value of the previous startup server acquired in S917. When it is determined that the evaluation value of the startup server exceeds the evaluation value of the previous startup server (Yes in S919), the previous startup server is changed to the startup server and the process is ended.

According to the process described above, an optimal server which takes characteristics of a flash memory into consideration can be determined as a startup server to be a server which starts up a target OS.

In addition, when an OS startup process is performed triggered by an OS startup request that specifies an OS, an optimal startup server can be determined from startup-capable servers including a previous startup server.

Moreover, when an OS startup process is performed triggered by an OS startup request that specifies an OS, the previous startup server is included in startup-capable servers. This is because, by starting up the target OS at the previous startup server, data related to the startup of the target OS need no longer be copied to a flash memory of another server and, accordingly, wasteful writing and erasing can be reduced. As a result, deterioration of flash memories can be prevented. In other words, when the startup server is not the previous startup server, data in the flash memory 53 of the previous startup server must be copied to the flash memory of the startup server and, after being copied, the data must be further erased from the flash memory of the previous startup server. In flash memories in which writing and erasing cause deterioration, wasteful writing and erasing must be kept to an absolute minimum. Therefore, by starting up the target OS at the previous startup server, wasteful writing and erasing can be reduced.

Figure 15:
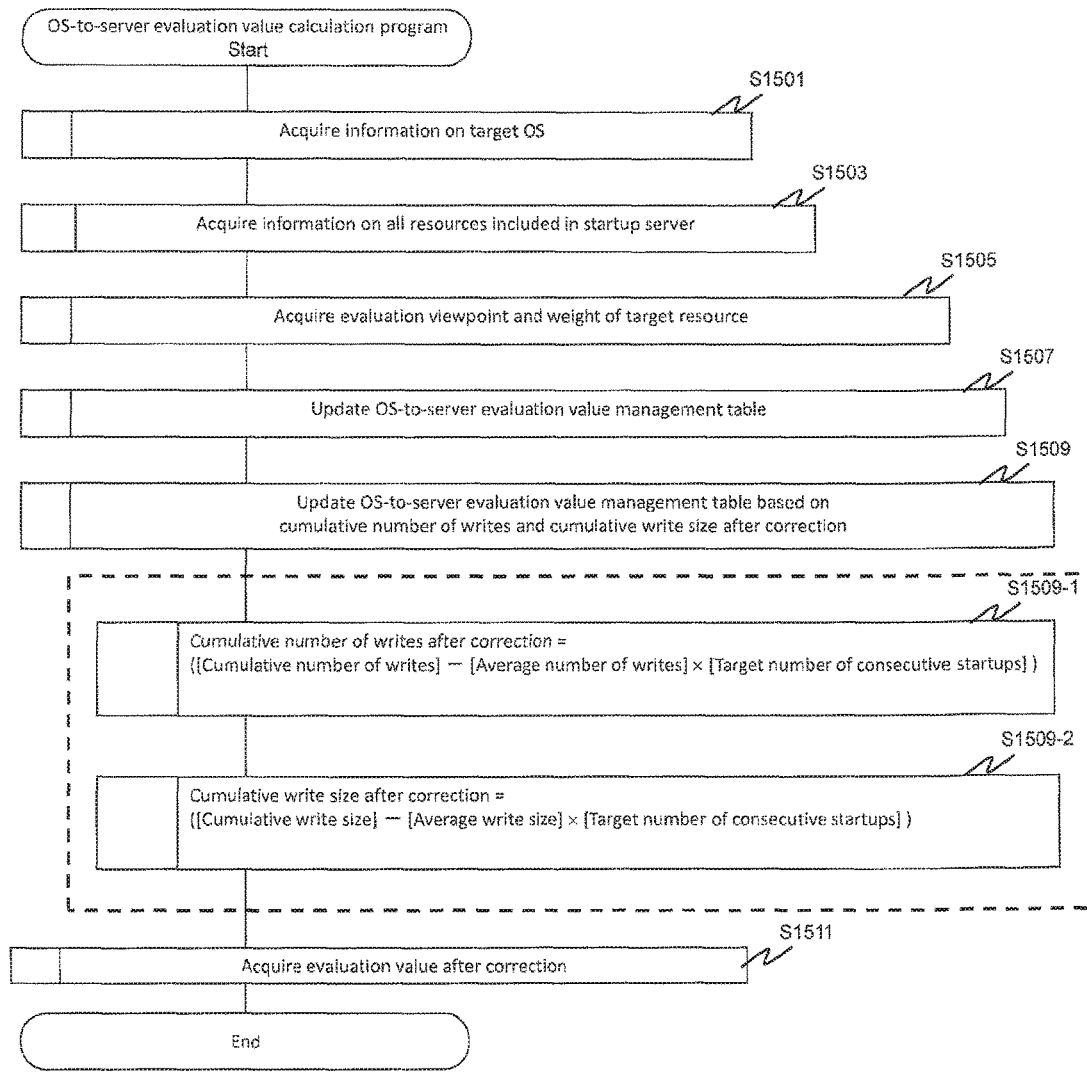
FIG. 15 is a flow chart of a server evaluation value calculation process of an OS.

FIG. 15 is a flow chart of a server evaluation value calculation process of an OS.

This is a process executed by the OS-to-server evaluation value calculation program 113 in S917 shown in FIG. 14.

In S1501, the program 113 refers to the OS management table 500 and acquires information on the target OS.

In S1503, the program 113 refers to the server management table 400 and acquires the server ID of the server having the target OS as the previous startup OS 403 or, in other words, the server ID 401 of the previous startup server. In addition, the program 113 refers to the resource management table 300, assumes all resources included in the acquired previous startup server to be target resources, and acquires information (entries) on the target resources.

In S1505, the program 113 refers to the resource evaluation viewpoint management table 600 and acquires the evaluation viewpoint 603 and the weight 605 of the target resources.

In S1507, the program 113 adds entries of the OS-to-server evaluation table 700 based on information on the target resources acquired in S1503 and, with respect to the added target resources, configures an ID of the previous startup server to the server ID 705.

In S1509, the program 113 updates the OS-to-server evaluation value management table 700 by configuring the cumulative number of writes and the cumulative write size after correction of the target resources. When the previous startup server starts up the target OS, increases in the cumulative number of writes and the cumulative write size are predicted to be smaller as compared to a case where another server starts up the target OS. In consideration thereof, the program 113 performs correction involving reducing the cumulative number of writes and the cumulative write size in order to prioritize the previous startup server. Hereinafter, steps for each evaluation viewpoint in the present step will be specifically described (the steps in the dotted frames).

In S1509-1, the program 113 corrects the cumulative number of writes of the target resource. Specifically, for example, the program 113 refers to the OS-to-server evaluation value management table 700 and the OS management table 500 and calculates a value by subtracting a value obtained by multiplying the average number of writes 509 per one startup of the target OS by the target number of consecutive startups 513 from the cumulative number of writes 309 as a cumulative number of writes after correction. In addition, the program 113 configures the cumulative number of writes 711 after correction to the OS-to-server evaluation value management table 700.

In S1509-2, the program 113 corrects the cumulative write size of the target resource. Specifically, for example, the program 113 refers to the OS-to-server evaluation value management table 700 and the OS management table 500 and calculates a value by subtracting a value obtained by multiplying the average write size 511 per one startup of the target resource by the target number of consecutive startups 513 from the cumulative write size 313 as a cumulative write size after correction. In addition, the program 113 configures the cumulative write size 715 after correction to the OS-to-server evaluation value management table 700.

In S1511, the program 113 calculates an evaluation value of the target resource after correction based on the cumulative number of writes and the cumulative write size after correction of the target resource in a similar manner to S1011. In addition, the program 113 updates the evaluation value 717 in the OS-to-server evaluation value management table 700 with the evaluation value of the target resource after correction and ends the process.

According to the process described above, an evaluation value of a resource (flash memory) can be calculated in consideration of the fact that use of the resource can be suppressed when the target OS is started up by the previous startup server. Accordingly, by favoring cases where the target OS operates on the previous startup server, wasteful use of resources can be prevented.

Specifically, with respect to the previous startup server, the resource evaluation value calculation program calculates an evaluation value of the target resource based on the cumulative number of writes after correction and the cumulative write size after correction. The cumulative number of writes after correction is a value calculated by subtracting a value obtained by multiplying an average number of writes per one startup of the target OS by the target number of consecutive startups 513 (FIG. 5) from an actual cumulative number of writes. A similar description applies to the cumulative write size after correction. As described above, with respect to the previous startup server, since the resource evaluation value calculation program calculates an evaluation value after correction based on the cumulative number of writes and the cumulative write size after correction, the calculation of the evaluation value of the target resource results in a smaller value than an actual value and the previous startup server can be preferentially selected as the startup server.

Moreover, a method of calculating the cumulative number of writes and the cumulative write size after correction is not limited to the method described above as long as the number of writes and the write size per one startup when initially starting up the OS which are assumed to represent a larger number of writes and a larger write size to the flash memory 53 are taken into consideration. For example, the number of writes and the write size per one startup of a previous startup server may be acquired from the previous startup server when, after executing a given OS, a target OS is startup up, and values obtained by subtracting these values from the cumulative number of writes and the cumulative write size may be adopted as the cumulative number of writes and the cumulative write size after correction.

Furthermore, a process in which a previous startup server is prioritized but not excessively so may be performed in place of the process described above. This is a process in which, for example, the management server 1 counts the number of times the target OS has been consecutively started up at the previous startup server and, once the number becomes the target number of consecutive startups or more, the previous startup server is no longer prioritized. Specifically, for example, an average number of writes per one startup of the target OS×(the target number of consecutive startups−the actual number of consecutive startups) can be adopted as the cumulative number of writes after correction. Moreover, a similar description applies to the cumulative write size after correction.

Using an evaluation value of the cumulative number of writes and an evaluation value of the cumulative write size after correction when determining a startup server, cumulative write amounts of resources in a plurality of servers in a computer system can be averaged while allowing a target OS to be consecutively started up at a same server (a previous startup server).

After the startup server changing process, the server startup pre-process, the server startup process, and the server startup post-process are performed in a similar manner to Embodiment 1 (refer to FIG. 8).

Moreover, in the present embodiment, in the server startup post-process (refer to FIG. 13), after S1507, the server startup post-process program 116 updates the OS-to-server evaluation value management table 700 and ends the process. Specifically, the program 116 deletes the entry of the startup server in the OS-to-server evaluation value management table 700.

Embodiment 3

Embodiment 3 will now be described. Similar components to Embodiments 1 and 2 will be described by assigning same reference signs. In addition, descriptions of components similar to Embodiments 1 and 2 may sometimes be omitted.

While an OS startup process between servers 5 that are physical servers has been described in Embodiments 1 and 2, an OS startup process may also be performed between virtual servers. In the present embodiment, a case where an OS startup process is performed between virtual servers will be described.

In a computer system according to the present embodiment, programs stored in a memory of the server 5 include a hypervisor. In this case, one or more virtual servers are provided as the CPU 54 executes the hypervisor. Therefore, the one or more virtual servers are to share the flash memory 53 with the server 5 (physical server).

In addition, in the present embodiment, there may be cases where one or more virtual servers operating on each server 5 respectively execute a different OS. Therefore, the flash memory of each server 5 may store update data of OSs to be started up on the one or more virtual servers operating on the server 5. Furthermore, the flash memory may also store startup data (and update data) of the hypervisor. Moreover, in the server management table 400, the previous startup OS 403 is to include IDs of the one or more virtual servers operating on the server 5 and IDs of a plurality of OSs are to be associated with the IDs of the virtual servers. In addition, the OSs to be started up on the virtual servers are to be also entered in the OS management table 500.

Hereinafter, the OS startup process according to the present embodiment will be described. The OS startup process according to the present embodiment (refer to FIG. 8) is similar to Embodiments 1 and 2 with the exception of OSs including OSs to be started up on virtual servers. Hereinafter, only portions that differ from Embodiments 1 and 2 will be supplementarily described.

In the startup server determination process according to the present embodiment (refer to FIG. 9), in S901, the switch destination/startup destination determination program 111 refers to the server management table 400 and when the power supply state 405 of a server is "ON", the server state is "normal", and a target OS is an OS to be started up on a virtual server in addition to when the power supply state 405 of a server is "OFF" and the server state is "normal" (Yes in S901), the switch destination/startup destination determination program 111 performs S903 to S907.

On the other hand, when the state of the server 5 is "abnormal" or when the target OS is not an OS to be started up on a virtual server (No in S901), the program 111 selects another server in the server management table 400 and repeats S901.

In the server startup pre-process according to the present embodiment (refer to FIG. 13), when copying data in the flash memory of the previous startup server in S1305, the server startup pre-process program 114 only copies update data of the virtual server.

In addition, when erasing data in the flash memory of the previous startup server in S1307, the server startup pre-process program 114 only erases update data of the virtual server.

Furthermore, in 51309, the server startup pre-process program 114 may change configuring values of the hypervisor such as configurations necessary for migration of a virtual server.

In the server startup process according to the present embodiment (refer to FIG. 14), in 51401, the server startup process program 115 may transmit an OS startup request to a virtual server as a startup server in addition to transmitting a request to turn on power to the startup server.

Moreover, the process described above can be applied not only to a case where the target OS is started up on a virtual server but also to a case where a hypervisor executing the virtual server executing the target OS is switched to a hypervisor being executed on another physical server. In this case, the management server 1 is to transmit an indication for migration of startup data and update data of a virtual server between hypervisors (in other words, between physical servers) to these physical servers. Therefore, a cumulative number of writes, a cumulative write size, and the like of the flash memories of the physical servers are to be taken into consideration when determining a hypervisor to execute the target OS.

While several embodiments have been described above, it is to be understood that the described examples merely represent embodiments for illustrating the present invention and that the scope of the present invention is not limited to the examples. The present invention can be implemented in various other modes.

In addition, while the examples presented above describe a non-volatile memory using a flash memory as an application target, the present invention is also applicable to non-volatile memory devices using other non-volatile memories such as an FeRAM (ferroelectric random access memory), an MRAM (magnetoresistive random access memory), an ovonic unified memory, and an RRAM (Resistance RAM, a registered trademark).

Moreover, while an OS startup process involves determining a startup server of an OS and starting up the OS by the startup server in the examples presented above, a startup target is not limited to an OS and may be any computer program.

REFERENCE SIGNS LIST

1 Management server
2 Network switch
3 Fibre Channel switch
4 Storage apparatus
5 Server
53 Flash memory

The invention claimed is:
1. A management server, comprising:
a memory;
a communication interface coupled to a plurality of servers each including a server processor and a non-volatile memory; and
a management processor coupled to the memory and the communication interface, data being written to the non-volatile memory by the server processor in each server of the plurality of servers in accordance with startup of a program, the memory being configured to store a limit value of a cumulative write amount of the non-volatile memory, the cumulative write amount being an amount of write data written cumulatively to the non-volatile memory, wherein the management processor is configured to
receive the cumulative write amount of the non-volatile memory from each of the plurality of servers,
calculate, when receiving a startup request for requesting startup of a first program, an evaluation value of the non-volatile memory in each server of the plurality of servers, based on a proportion of the stored cumulative write amount with respect to the stored limit value of each server of the plurality of servers,
select servers, on which a program is not executed and which are in a normal state, as startup-capable servers from among the plurality of servers when receiving the startup request,
select one startup server from among the startup-capable servers based on the calculated evaluation values,
transmit, when a first server executing the first program from among the plurality of servers is specified by the startup request, an indication for copying data stored in a non-volatile memory of the first server to the non-volatile memory of the startup server to the first server,
transmit an execution indication for indicating startup of the first program to the selected startup server, and
store server management information that is information indicating a program last started up by each of the plurality of servers in the memory, and
wherein when the first program is specified by the startup request, the management processor is configured to
select a server, the last started up program of which is the first program, as a previous startup server based on the server management information,
correct the evaluation value of the previous startup server by reducing the evaluation value, and
select a server with a lowest evaluation value from among the plurality of servers as the startup server.
2. The management server according to claim 1, wherein the management processor is configured to
when the program last started up by the startup server prior to transmission of the execution indication is not the first program, transmit to the first server an indication for copying data stored in the non-volatile memory of the previous startup server from among the plurality of servers to a non-volatile memory of the startup server, and
transmit an execution indication for requesting startup of the first program to the startup server.
3. The management server according to claim 2, wherein the management processor is configured to
when a program last started up by the startup server prior to transmission of the execution instruction is not the first program, transmit an indication for erasing data stored in the non-volatile memory of the startup server after the copying.

4. A computer system comprising:
a plurality of servers each including a server processor and a non-volatile semiconductor memory;
a management server coupled to the plurality of servers; and
a storage apparatus coupled to the plurality of servers,
wherein the server processor in each server of the plurality of servers is configured to write data to the non-volatile memory in accordance with startup of a program,
wherein the management processor is configured, for each server of the plurality of servers, to
store a limit value of a cumulative write amount of the non-volatile memory, the cumulative write amount being an amount of write data written cumulatively to the non-volatile memory,
receive a cumulative write amount of the non-volatile memory from each of the plurality of servers,
calculate, when a startup request for requesting startup of a first program is received, an evaluation value of the non-volatile memory in each server of the plurality of servers, based on a proportion of the stored cumulative write amount with respect to the stored limit value of each server of the plurality of servers,
select one startup server from among the plurality of servers based on the calculated evaluation values,
store application information that indicates whether or not data to be stored in a non-volatile memory included in each of the plurality of servers is copied to the storage apparatus,
determine, when a first server executing the first program from among the plurality of servers is specified by the startup request, whether or not data stored in the non-volatile memory of the first server is copied to the storage apparatus based on the application information,
transmit, when determination is made that the data stored in the non-volatile memory of the first server is copied to the storage apparatus, to the first server an indication for copying the data to the non-volatile memory of the startup server,
transmit an execution indication for indicating startup of the first program to the selected startup server, and
wherein the server processor of the startup server is configured to receive the execution indication and start up the first program, and
wherein the management server is configured to store server management information that is information indicating a program last started up by each of the plurality of servers in the memory, and, when the first program is specified by the startup request,
select a server, the last started up program of which is the first program, as the previous startup server based on the server management information,
correct the evaluation value of the previous startup server by reducing the evaluation value, and
select a server with a lowest evaluation value from among the plurality of servers as the startup server.

5. The computer system according to claim 4, further comprising
a storage apparatus coupled to the plurality of servers, wherein the management server is configured to
store application information that indicates whether or not data to be stored in a non-volatile memory included in each of the plurality of servers is copied to the storage apparatus, determine, when a program last started up by the startup server prior to transmission of the execution indication is not the first program, whether or not data stored in the non-volatile memory of the previous startup server is to be copied to the storage apparatus based on the application information,
transmit, when determination is made that the data stored in the non-volatile memory of the previous startup server is not copied to the storage apparatus, to the first server an indication for copying the data stored in the non-volatile memory of the previous startup server from among the plurality of servers to the non-volatile memory of the startup server, and
transmit an execution indication for requesting startup of the first program to the startup server.

6. A management method of a plurality of servers each including a server processor and a non-volatile memory, the management method comprising:
storing a limit value of a cumulative write amount of the non-volatile memory, the cumulative write amount being an amount of write data written cumulatively to the non-volatile memory;
receiving a cumulative write amount of the non-volatile memory from each of the plurality of servers;
calculating, when a startup request for requesting startup of a first program is received, an evaluation value of the non-volatile memory in each server of the plurality of servers based on a proportion of the stored cumulative write amount with respect to the stored limit value of each server of the plurality of servers;
selecting one startup server from among the plurality of servers based on the calculated evaluation values,
transmitting, when a first server executing the first program from among the plurality of servers is specified by the startup request, an indication for copying data stored in a non-volatile memory of the first server to the non-volatile memory of the startup server to the first server,
transmitting an execution request for requesting startup of the first program to the selected startup server, wherein data is written to the non-volatile memory by the server processor in accordance with startup of a program, and
storing server management information that is information indicating a program last started up by each of the plurality of servers in the memory, and
when the first program is specified by the startup request, then
selecting a server, the last started up program of which is the first program, as a previous startup server based on the server management information,
correcting the evaluation value of the previous startup server by reducing the evaluation value, and
selecting a server with a lowest evaluation value from among the plurality of servers as the startup server.

7. The management method according to claim 6, further comprising:
when the program last started up by the startup server prior to transmission of the execution indication is not the first program, transmitting to the first server an indication for copying data stored in the non-volatile memory of the previous startup server from among the plurality of servers to a non-volatile memory of the startup server, and
transmitting an execution indication for requesting startup of the first program to the startup server.

8. The management method according to claim 7, further comprising:

when a program last started up by the startup server prior to transmission of the execution instruction is not the first program, transmitting an indication for erasing data stored in the non-volatile memory of the startup server after the copying.

* * * * *